United States Patent [19]

Hjelmvik

[11] Patent Number: 5,770,845
[45] Date of Patent: Jun. 23, 1998

[54] METHOD OF BILLING FOR PARKING FACILITIES BY MEANS OF PAY METERS

[75] Inventor: Torbernt Hjelmvik, Järfälla, Sweden

[73] Assignee: Modul-System Sweden AB, Jarfälla, Sweden

[21] Appl. No.: 704,759

[22] PCT Filed: Mar. 24, 1995

[86] PCT No.: PCT/SE95/00317

§ 371 Date: Sep. 25, 1996

§ 102(e) Date: Sep. 25, 1996

[87] PCT Pub. No.: WO95/27269

PCT Pub. Date: Oct. 12, 1995

[30] Foreign Application Priority Data

Mar. 31, 1994 [SE] Sweden .................................. 9401104

[51] Int. Cl.$^6$ ............................. G06F 7/08; G06F 17/00; G06K 15/00
[52] U.S. Cl. ......................... 235/382; 235/381; 235/383; 364/401; 364/467
[58] Field of Search .................................. 235/381, 382, 235/383, 486, 492, 375, 384, 385; 364/401, 467

[56] References Cited

U.S. PATENT DOCUMENTS

| | | | |
|---|---|---|---|
| 4,258,252 | 3/1981 | Simjian ................................... | 235/381 |
| 4,532,418 | 7/1985 | Meese et al. ........................... | 235/381 |
| 4,576,273 | 3/1986 | Milnes ................................... | 235/489 |
| 4,587,410 | 5/1986 | Milnes ................................... | 235/381 |
| 4,786,787 | 11/1988 | Nawada et al. ........................ | 235/381 |
| 4,788,419 | 11/1988 | Walters et al. .......................... | 235/381 |
| 4,861,971 | 8/1989 | Chan ...................................... | 235/381 |
| 4,864,506 | 9/1989 | Storace .................................. | 235/381 |
| 4,880,097 | 11/1989 | Speas ..................................... | 235/492 |
| 5,166,680 | 11/1992 | Ganot ..................................... | 235/384 |
| 5,278,395 | 1/1994 | Benezet .................................. | 235/382 |
| 5,293,030 | 3/1994 | Dietrich et al. ......................... | 235/381 |
| 5,351,187 | 9/1994 | Hassett ................................... | 235/384 |
| 5,490,077 | 2/1996 | Freytag .................................. | 235/381 |
| 5,510,992 | 4/1996 | Kara ....................................... | 235/381 |
| 5,606,507 | 2/1997 | Kara ....................................... | 235/381 |
| 5,648,906 | 7/1997 | Amirpanahi ............................ | 235/375 |

FOREIGN PATENT DOCUMENTS

| | | |
|---|---|---|
| 0447312 | 9/1991 | European Pat. Off. . |
| 0582098 | 2/1994 | European Pat. Off. . |
| 8905498 | 6/1989 | WIPO . |

*Primary Examiner*—Hoanganh T. Le
*Assistant Examiner*—Thien Minh Le
*Attorney, Agent, or Firm*—Alfred J. Mangels

[57] ABSTRACT

A method of cash card billing with the aid of parking or pay meters when parking a vehicle. A meter system includes a plurality of meters, each constituting an independent operative unit. The meters are equipped with a cash card reader, wherein a person parking a vehicle finds a meter and with the aid of the cash card reader feeds-in information from the cash card relating at least to the cash card account number, and wherein upon commencement of the parking period and subsequent to having read the cash card, the meter issues a parking ticket. When terminating the parking period, the parking ticket is read in a second meter, which can be any meter in the parking system, including the original meter. The second meter stores the transaction number read by the meter from the parking ticket, together with the time at which the ticket was read, which is the parking termination time. Memories contained in the respective first and second meters are read and that information is transferred to the memory of a central computer that combines the respective transactions with the aid of the transaction numbers and charges the cash card account number with a parking cost calculated based on the parking commencement time and the parking termination time.

11 Claims, 1 Drawing Sheet

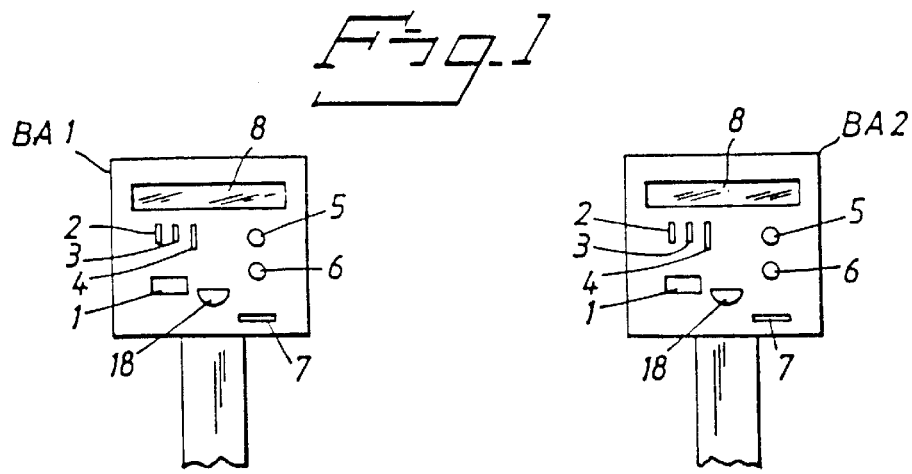
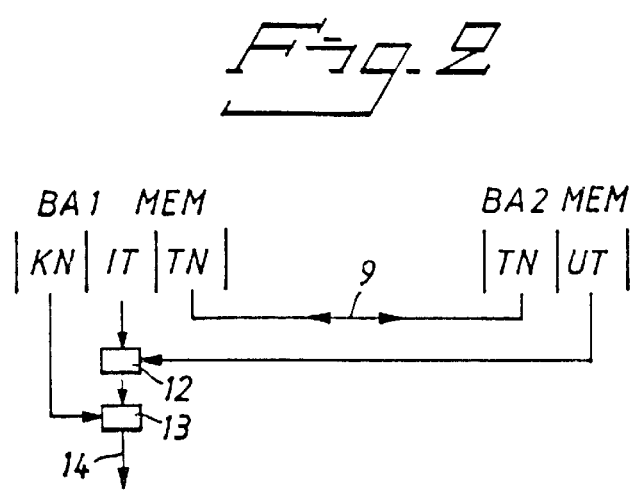
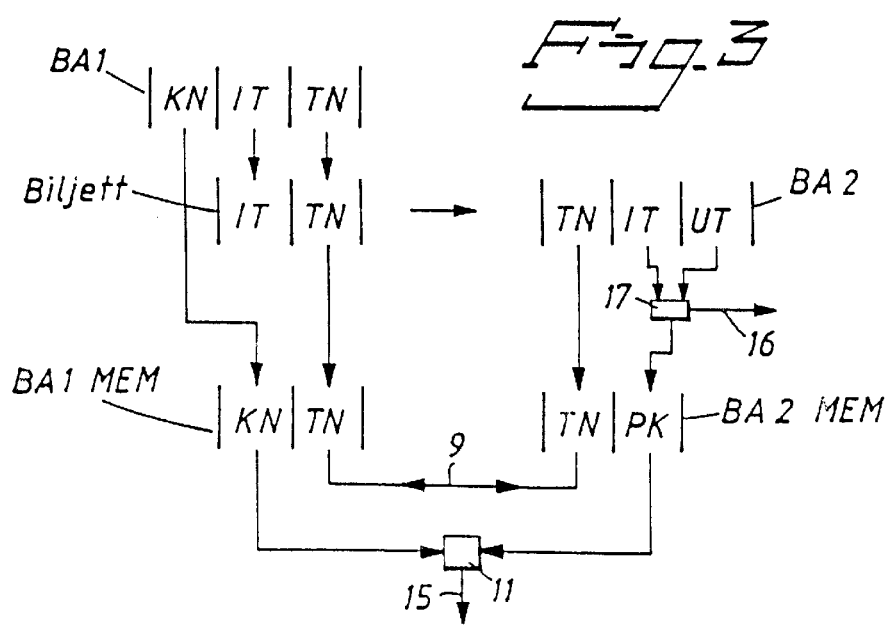

METHOD OF BILLING FOR PARKING FACILITIES BY MEANS OF PAY METERS

BACKGROUND OF THE INVENTION

1. Field of the Invention

The present invention relates to a method of billing for the parking of vehicles by means of parking meters or pay meters. More specifically, but not exclusively, the invention relates to a method for billing a parking fee to a cash card, pay card or credit card account.

2. Description of the Related Art

In cities, towns and other municipalities, there will be one or more vehicle parking companies who have parking meters, or so-called pay meters, distributed throughout the city or town in a number of different places, where streets, roads and large parking areas are the most common places.

In recent times, it has become possible to pay parking fees with different types of banker's card or cash card, in addition to coin payment. When a cash card is used, the person parking a vehicle will draw the card through a card reader on the parking meter.

The invention relates to the type of payment system in which the person parking a vehicle draws a cash card through a card reader in the parking meter, whereupon the meter stores the card number and the time at which the card was read, and then issues a parking ticket. This ticket is usually placed on the dashboard, in a position where it can be seen.

According to one known system, when collecting the vehicle the person concerned again goes to the parking meter and again draws the card through the card reader. The parking meter then again stores the card number and compares the vehicle collection time with the earlier time at which the card was first drawn through the card reader installed in the parking meter. The parking meter then calculates the parking fee to be billed and stores this sum together with the number of the card to be charged, and issues a receipt.

One problem with this system is that when collecting the vehicle, it is necessary to go to the same parking meter as that in which the card was read on the parking occasion, in order for the card to be read again on the vehicle collecting occasion. More specifically, the problem resides in the fact that certain parking areas include a large number of parking meters and occasionally drivers forget which parking meter they have used when parking the vehicle. Another problem is that people who park a vehicle several times in a number of different parking places and within a limited time period are forced to find the appropriate parking meter twice on each separate parking occasion.

One solution to these problems would be to connect all parking meters permanently to a central computer in an on-line system, in which the storage of all information and the calculation of all parking fees, the billing of the accounts of respective cash cards, etc., is dealt with centrally. This solution cannot be put into practice, however, because of the excessively high cost entailed by connecting all parking meters to a central computer.

It is therefore highly desirable to be able to use any parking meter whatsoever when parking a vehicle and then use any parking meter or pay meter whatsoever when collecting the vehicle. The only requirement would be that the two meters used belong to one and the same vehicle parking company. In this regard, it would be possible to commence a series of parking occasions at one place in the city or town and draw the cash card through the reader of a given meter and to terminate the series of parking occasions at another place in the city or town, by drawing the card through the reader of another meter.

The present invention solves this problem despite the fact that each meter may be free-standing and thus not connected to other meters or to a central computer.

SUMMARY OF THE INVENTION

The present invention thus relates to a method of cash card billing with the aid of meters when parking a vehicle. There is provided a parking meter system which includes a plurality of meters, each constituting an independent operative unit, wherein the meters are equipped with a cash card reader. A person parking a vehicle finds a meter and with the aid of the cash card reader feeds-in information from the cash card relating at least to the cash card account number. Upon commencement of the parking period and subsequent to having read the cash card, the meter issues a parking ticket. The method is characterized in that when the cash card is read by a first meter in conjunction with the commencement of said parking period, the meter is caused to store the account number (KN) and the time in question, the parking commencement time (IT), together with a transaction number, (TN), as a first transaction (T1) in a memory which belongs to the first meter. The transaction number is unique at least for a given predetermined time period. The meter is caused to issue a parking ticket on which said transaction number is given in a form which can be read by a meter. When terminating the parking period, the parking ticket is caused to be read in a second meter, which may be any chosen meter in the meter system, including the said first meter, wherein the second meter is caused to store the transaction number (TN) read by the meter from the parking ticket together with the time at which the ticket was read, the parking termination time (UT), in a memory belonging to said second meter as a second transaction (T2). The memories of the respective first meter and the respective second meter are emptied and transferred to the memory of a central computer, and the central computer is caused to combine the respective transactions (T1) and (T2) of the first and the second meters with the aid of the transaction numbers (TN) and therewith charge the cash card account number (KN) with a parking cost calculated on the vehicle parking commencement time (IT) and the parking termination time (UT).

BRIEF DESCRIPTION OF THE DRAWINGS

The invention will now be described in more detail with reference to an exemplifying embodiment thereof and also with reference to the accompanying drawing, in which FIG. 1 is a schematic illustration of two parking meters BA1 and BA2;

FIG. 2 is a flow schematic of a first embodiment of the invention; and

FIG. 3 is a flow schematic of a second embodiment of the invention.

DESCRIPTION OF THE PREFERRED EMBODIMENTS

FIG. 1 illustrates two parking meters BA1 and BA2 which are independent operative units and which are assumed to be distanced from one another, for instance located at mutually different parking places.

The invention relates to a method in which there is used a plurality of meters which belong to a parking charging system and each of which is an independent operative unit. By system is meant, for instance, that the various meters are mutually identical and are operated on the behalf of one and the same vehicle parking company. The meters are equipped with a cash card reader 1. The meters may also be equipped with a coin insertion means 2–4 in which coin payments can be made, and with a pay button 5 and a cancel button 6, both intended for coin payments. The meters also include a coin cup 18. The meters are also provided with a dispensing slot 7 through which a parking ticket is dispensed at the beginning of a parking period. This slot is also preferably used for the insertion of a parking ticket when the parking period is terminated, wherein the meter is constructed to read from the parking ticket information which was written thereon in a meter-readable form when the ticket was issued in conjunction with the beginning of a parking period. The meters may also include a conventional display 8, for displaying time, the time at which a stipulated parking period expires in the case of coin payments, that the cash card has been read, that the cash card is invalid, etc.

The present invention, however, relates to cash card payments.

When paying by cash card, or banker's card, a person wishing to park a vehicle finds a meter at the beginning of the parking period and inserts into the meter with the aid of the cash card reader 1 information carried on the cash card with regard to at least the cash card account number. The meter is constructed to issue a parking ticket at the beginning of the parking period and after the cash card has been read. This parking ticket shall be placed inwardly of the vehicle windscreen in a position in which it can be seen by parking attendants, who can therewith establish that a valid parking ticket has been collected from a meter.

According to the invention, as the cash card is read in a first meter BA1, in conjunction with commencing a parking period, the meter stores in a memory belonging to the meter the cash card account number (KN) and the time in question, the parking commencement time (IT), together with a transaction number (TN), as a first transaction (T1). This is illustrated in FIG. 2, where BA1 MEM denotes the memory of the first meter. The three pieces of information KN, IT and TN are also stored in the memory. The meter is constructed to then dispense a parking ticket on which at least the aforesaid transaction number is reproduced in a meter-readable form.

The meter-readable part of the parking ticket includes one of the following codes: magnetic code, punched or bar code or some other known code that can be read by a meter.

When terminating the parking period, the parking ticket is caused to be read in a second meter BA2. BA2 may be any chosen meter in the meter system, including the first meter BA1. The second meter BA2 is caused to store the transaction number (TN) read by said meter from the parking ticket, together with the time at which the ticket was read, the parking termination time (UT), in a memory BA2 MEM belonging to the second meter as a second transaction (T2). This is illustrated to the right of FIG. 2, where the memory contains the pieces of information TN and UT.

In order for the system to be safe, it is necessary that each transaction number is unique, at least for a predetermined period of time, for instance a period which exceeds the longest time for which parking is allowed within the system. Otherwise, one and the same transaction number is liable to occur on two or more different parking occasions, which would be liable to result in wrong billing.

Naturally, it is also possible to create unique transaction numbers in different ways. According to one particularly preferred embodiment, each meter in the system is allocated a unique series of transaction numbers. These transaction numbers are preferably composed of a number sequence which is preceded by a prefix that constitutes the identification number (BA NR) of the meter concerned.

The memories installed in the meters may be of any suitable kind, for instance a RAM memory, a FLASH memory or some other semiconductor memory.

The memories of the first and the second meters are emptied at given intervals. This can be done by personnel who transfer the information to a portable memory or which replace the memory of the meter with another memory. Alternatively, the information contained by the memories of respective meters can be collected off-line, through the medium of a cable, modem or radio, and therewith transferred to a central computer. Information that is collected by personnel is also transferred to the memory of a central computer.

The central computer is caused to combine the respective transactions (T1) and (T2) of the first and the second meters with the aid of the transaction numbers (TN). In this regard, the transaction number TN obtained from the first meter is simply paired with the same transaction number from the second meter. This is illustrated in FIG. 2 by the arrow 9. By pairing together the pieces of information from the two meters, information is obtained relating to the parking commencement time IT on a given parking occasion, the parking termination time UT and the account number KN to be billed. The central computer then bills the cash card account number KN for the parking period covered by the parking commencement time IT and the parking termination time UT.

According to a first embodiment of the invention, illustrated in FIG. 2, the parking ticket contains only information relating to the transaction number TN in a meter-readable form. The parking period and the parking cost are calculated in the central computer. This is illustrated by block 12 which denotes calculation of the parking period and the parking cost. The result of this calculation is combined with the account number KN, as illustrated in block 13. Arrow 14 illustrates an account number KN billing transaction.

In the case of this embodiment, the memory of the first meter needs to contain the transaction number TN, the account number KN and the parking commencement time IT. The memory of the second meter contains the transaction number TN as read from the parking ticket, and the parking termination time UT.

FIG. 3 illustrates another embodiment of the invention in which the parking ticket 10 also contains the parking commencement time IT in a meter-readable form. In this case, both the parking commencement time IT and the transaction number TN are read from the parking ticket in the second meter. In this case, the parking period and optionally the parking cost can be calculated in the computer 17 of the second meter. In this case, only the transaction number TN need be stored together with the parking cost PK in the memory of the second meter. Only the transaction number TN and the account number KN need be stored in the memory of the first meter. This is illustrated by BA1 MEM and BA2 MEM in FIG. 3.

In the same manner as that before mentioned, the transaction numbers TN are paired together in a central computer 11, which bills the cash card account number KN with a sum which equals the parking cost PK. The arrow 15 illustrates a billing transaction.

As will be evident from the foregoing, the invention enables a person to use one meter in the system when parking is commenced and another meter in the system when parking is terminated.

Furthermore, the cash card is used only once, which eliminates the risk of a person using two different cash cards when commencing and terminating a parking period respectively. Should the method require a cash card to be read when both commencing and terminating a parking occasion and two different cash cards were used at the beginning and the end of this occasion, the system would understand that two different parking occasions had been commenced at different times and that none of the two parking occasions had been terminated. This would be liable to result in greatly extended parking costs and, for instance, high parking fees (fines) for exceeding a maximum permitted parking period.

Furthermore, one and the same cash card can be used for parking two vehicles at one and the same time, for instance. In this case, the first meter first reads the cash card and issues a parking ticket. This ticket is provided with a transaction number TN. The procedure is then repeated, whereupon the meter issues a further parking ticket which is given a different transaction number. Since the transaction numbers are different, billing will be correct even though one and the same cash card is used and even though the vehicles are collected at different times and from different parking places.

In the case of known systems in which one and the same meter is used at both the commencement and the termination of a parking period, there is often a check procedure incorporated in the system, which means that a parking attendant must obtain from the meter a so-called vehicle present list, i.e. a written list of the ticket numbers printed on the parking tickets for those vehicles that have commenced a parking period but have still not terminated said period. In such a system, the meter prints a number on the parking ticket at the commencement of a parking period. The parking attendant then walks among the vehicles and compares the number on the parking tickets, visible through the windscreen of the various vehicles, with the numbers on the vehicle present list in his possession. One form of cheating that may occur is when a motorist who has obtained a parking ticket as a parking commencement ticket pays for the ticket in a pay meter shortly after the ticket has been issued, and then places the paid ticket so that it can be seen through the windscreen in the hope that a parking attendant will believe that the motorist concerned has taken a parking ticket but has still not paid. In this case, however, the number of the parking ticket will not be found on the vehicle present list. The person concerned is levied a fine in such cases.

According to one preferred embodiment of the invention, the parking commencement time (IT) is visibly printed on the parking ticket by the first meter. This enables the ticket to be checked without requiring the so-called vehicle present list.

According to another preferred embodiment of the invention, the second meter is caused to cancel the parking ticket and to dispense the ticket after having read the transaction number (TN) and any further meter-readable information. This prevents an old ticket from being used, since a parking attendant is able to see that the ticket is invalid.

In the case of the embodiment illustrated in FIG. 3, i.e. the embodiment in which the second meter is caused to calculate the parking cost, the second meter is preferably caused to present the parking cost on its display 8, the display control being illustrated by the arrow 16 in FIG. 3. Alternatively, or in addition, the parking cost can be printed on the parking ticket issued by the meter after having read the card. In this latter case, the parking ticket serves as a receipt and is therewith rendered unusable on a subsequent parking occasion, since a parking attendant will see that the ticket is a used ticket.

According to one preferred embodiment, the first meter will disclose the identification number (BANR) of the meter on the parking ticket, at least in a meter-readable form, but alternatively also in a visible form. It is also preferred that said identification number is stored in the memory of the second meter together with other information involved in the second transaction (T2). The identification number of the second meter is conveniently stored in its memory in conjunction with all transactions (T2). These embodiments are favorable because in the event of objections concerning wrong billing for instance, it is possible to establish where parking was commenced and terminated respectively.

It will be understood that the invention can be modified in relation to the above-described and illustrated embodiments, without departing from the central concept of using an unique transaction number for pairing together two different transactions made in two different meters to a single transaction on which billing can be based.

The present invention is not therefore restricted to the above-described and illustrated exemplifying embodiments thereof, since modifications and changes can be made within the scope of the following Claims.

What is claimed is:

1. A method of cash card billing with the aid of meters when parking a vehicle, said method comprising the step of:
   a. providing a meter system which includes a plurality of meters, each constituting an independent operative unit, wherein the meters each include a cash card reader;
   b. inserting into the cash card reader of a first meter a cash card including at least a cash card account number;
   c. issuing a from the first meter at the commencement of a parking period a parking ticket subsequent to reading the cash card, said parking ticket including a meter-readable transaction number;
   d. storing in the first meter the cash card account number and a parking commencement time, and a first transaction number as a first transaction in a memory associated with the first meter, wherein the first transaction number is unique at least for a given predetermined time period;
   e. at the end of a parking period, inserting the parking ticket in a second meter which may be any chosen meter in the meter system, including the first meter;
   f. reading in the second meter the parking ticket first transaction number;
   g. storing in a memory associated with the second meter the first transaction number read from the parking ticket together with the time at which the ticket was read to provide a parking termination time and a second transaction having a second transaction number;
   h. transferring information contained in the memories associated with the first meter and the second meter to a memory of a central computer;
   i. combining in the central computer the respective transactions of the first and the second meters with the aid of the transaction numbers; and
   j. charging the cash card account number with a parking cost based on the vehicle parking commencement time and the parking termination time.

2. A method according to claim 1, including the step of allocating a unique series of transaction numbers to each meter in the system.

3. A method according to claim 1 including the step of printing the parking commencement time visibly on the parking ticket.

4. A method according to claim 1, including the step of cancelling the parking ticket by the second meter subsequent to having read the first transaction number.

5. A method according to claim 1, including the additional steps of:

k. applying to the parking commencement time in a meter-readable form;

l. in the second meter reading the parking commencement time when reading a parking ticket and comparing that time with the parking termination time;

m. calculating the parking cost in a computer associated with the second meter; and n. storing the calculated parking cost together with the first transaction number.

6. A method according to claim 5, including the step of displaying the parking cost on the second meter.

7. A method according to claim 1, including the step of applying to the parking ticket while in the first meter a first meter identification number in at least a meter-readable form.

8. A method according to claim 7, including the step of storing said meter identification number in a memory associated with the second meter together with information relating to the second transaction.

9. A method according to claim 1, wherein the meter-readable part of the parking ticket includes a form of information coding selected from the group consisting of magnetic code, punched code, bar code and printed, meter-readable code.

10. A method according to claim 5, including the step of printing the parking cost on the parking ticket in the second meter after the second meter has read the parking ticket.

11. A method according to claim 1, including the step of applying to the parking ticket while it is in the first meter a first meter identification number in a visible form.

* * * * *

UNITED STATES PATENT AND TRADEMARK OFFICE
CERTIFICATE OF CORRECTION

PATENT NO. : 5,770,845
DATED : June 23, 1998
INVENTOR(S) : TORBERNT HJELMVIK

It is certified that error appears in the above-indentified patent and that said Letters Patent is hereby corrected as shown below:

Column 6, line 2 of Claim 1, change "step" to --steps--.

Column 7, line 3 of Claim 5, after "parking" insert --ticket the parking--.

Signed and Sealed this

Twenty-fifth Day of August, 1998

Attest:

BRUCE LEHMAN

*Attesting Officer*  *Commissioner of Patents and Trademarks*